(12) United States Patent
Chonan et al.

(10) Patent No.: US 12,147,289 B2
(45) Date of Patent: Nov. 19, 2024

(54) INFORMATION PROCESSING APPARATUS AND CONTROL METHOD

(71) Applicant: Lenovo (Singapore) Pte. Ltd., Singapore (SG)

(72) Inventors: Tsutomu Chonan, Kanagawa (JP); Atsunobu Nakamura, Kanagawa (JP); Takuroh Kamimura, Kanagawa (JP); Hiroki Oda, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 30 days.

(21) Appl. No.: 18/159,797

(22) Filed: Jan. 26, 2023

(65) Prior Publication Data

US 2023/0266816 A1    Aug. 24, 2023

(30) Foreign Application Priority Data

Feb. 24, 2022   (JP) ................................. 2022-026519

(51) Int. Cl.
| | |
|---|---|
| G06F 1/3296 | (2019.01) |
| G06F 1/20 | (2006.01) |
| G06F 1/3206 | (2019.01) |
| G06F 1/324 | (2019.01) |

(52) U.S. Cl.
CPC .............. *G06F 1/3296* (2013.01); *G06F 1/20* (2013.01); *G06F 1/206* (2013.01); *G06F 1/3206* (2013.01); *G06F 1/324* (2013.01); *Y02D 10/00* (2018.01)

(58) Field of Classification Search
CPC .......... G06F 1/20; G06F 1/206; G06F 1/3206; G06F 1/324; G06F 1/3296; Y02D 10/00
See application file for complete search history.

(56) References Cited

U.S. PATENT DOCUMENTS

| | | | |
|---|---|---|---|
| 9,547,353 B1* | 1/2017 | Marr | ...................... G06F 1/3206 |
| 11,847,009 B1* | 12/2023 | Khosrowpour | ..... G06F 11/3433 |
| 2010/0161943 A1* | 6/2010 | Young Su | ................. G06F 1/08 |
| | | | 712/205 |
| 2021/0303054 A1* | 9/2021 | Zhu | .......................... G06F 1/329 |

FOREIGN PATENT DOCUMENTS

JP            2011-8728 A      1/2011

* cited by examiner

*Primary Examiner* — Terrell S Johnson
(74) *Attorney, Agent, or Firm* — Osha Bergman Watanabe & Burton LLP (57) ABSTRACT

An information processing apparatus includes: a processor with variable rated power; and a power control unit which controls power consumption of the processor. When processing based on a specific application as an application program to implement a specific function is executed in foreground, the power control unit sets rated power corresponding to at least the specific function.

6 Claims, 6 Drawing Sheets

| POWER CONTROL MODE | ECO (E) | BALANCE (B) | HIGH PERFORMANCE (P) |
|---|---|---|---|
| TARGET TEMPERATURE [°C] | TEMe | TEMb | TEMp |
| FAN OUTPUT [rpm] | RPMe | RPMb | RPMp |
| SET POWER [W] PL2 | PL2e | PL2b | PL2p |
| SET POWER [W] PL1 | PL1e | PL1b | PL1p |

FIG. 5

| KEY SCENARIO | KS1 | KS2 | KS3 | KS4 | KS5 | KS6 |
|---|---|---|---|---|---|---|
| KEY APP | app1.exe | app2.exe | app3.exe | app4.exe | app5.exe | app6.exe |
| POWER SUPPLY TYPE | DC | DC | DC | AC/DC | AC/DC | DC |
| FAN OUTPUT [dB SPL] | RPMks1 | RPMks2 | RPMks3 | RPMks4 | RPMks5 | RPMks6 |
| SET POWER [W] PL2 | PL2ks1 | PL2ks2 | PL2ks3 | PL2ks4 | PL2ks5 | PL2ks6 |
| SET POWER [W] PL1 | PL1ks1 | PL1ks2 | PL1ks3 | PL1ks4 | PL1ks5 | PL1ks6 |

| POWER CONTROL MODE | STATE | DURATION |
|---|---|---|
| CPU: KS | Key app = ON(FG) | — |
| CPU: HIGH PERFORMANCE (P) | CPU Power ≥ SPbp | Tbp |
| CPU: BALANCE (B) | CPU Power ≥ SPeb | Teb |
| CPU: ECO (E) | CPU Power ≤ SPbe | Tbe |
| CPU: BALANCE (B) | CPU Power ≤ SPpb | Tpb |

| KEY SCENARIO | | UC1 | UC2 |
|---|---|---|---|
| KEY APP | | appuc.exe | appuc.exe |
| POWER SUPPLY TYPE | | DC/AC | DC/AC |
| DEVICE STATE | | CAMERA OFF | CAMERA ON |
| FAN OUTPUT [dB SPL] | | RPMuc1 | RPMuc2 |
| SET POWER [W] | PL2 | PL2uc1 | PL2uc2 |
| | PL1 | PL1uc1 | PL1uc2 |

INFORMATION PROCESSING APPARATUS AND CONTROL METHOD

CROSS-REFERENCE TO RELATED APPLICATIONS

This application claims priority to Japanese Patent Application No. 2022-26519 filed Feb. 24, 2022, the contents of which are incorporated herein by reference in their entirety.

BACKGROUND OF THE INVENTION

Field of the Invention

The present disclosure relates to a technique for controlling the power consumption of an information processing apparatus.

Description of the Related Art

An information processing apparatus such as a personal computer (PC) includes a processor such as a CPU (Central Processing Unit). One or more processors may be integrated with cache memories, input/output interfaces, other types of devices, and configured as a SoC (System on a Chip). Each processor executes main arithmetic processing in the information processing apparatus, which consumes some of power. In general, the higher the power consumption, the higher the processing power of the processor will be demonstrated. Therefore, there is an information processing apparatus including a control mechanism for monitoring the power consumption of the processor to increase rated power as the power consumption increases.

Patent Document

[Patent Document 1] Japanese Unexamined Patent Application Publication No. 2011-008728

SUMMARY OF THE DISCLOSURE

However, when a specific function is provided, performance may not be improved though more power is consumed. For example, the processing time may not be reduced even when set power exceeds a certain value. As the specific function, there are unified communication (UC), content streaming playback, material creation, and the like. The increase in power consumption without improving performance causes wasted power. Particularly, when the supply of AC power from the outside is stopped and hence DC power from a battery is consumed, there is a high need to prevent wasted power.

The present disclosure solves the above problem, and an information processing apparatus according to the first aspect of the present disclosure includes: a processor with variable rated power; and a power control unit which controls the power consumption of the processor, wherein when processing based on a specific application as an application program to implement a specific function is executed in the foreground, the power control unit sets rated power corresponding to at least the specific function.

An information processing apparatus according to the second aspect of the present disclosure includes: a processor connected to a device to input and output predetermined information and whose rated power is variable; and a power control unit which controls the power consumption of the processor, wherein when the execution of a specific application as an application program to implement a specific function is detected and the device works, the power control unit sets more rated power than that when the device does not work.

The above information processing apparatus may be such that the device is a camera and the specific function is unified communication.

The above information processing apparatus may also be such that when power is not supplied from an external power supply, the power control unit sets rated power corresponding to the specific function.

The above information processing apparatus may further be such that when power is not supplied from an external power supply, the power control unit sets rated power corresponding to the specific function.

Further, the above information processing apparatus may be such that when setting the rated power corresponding to the specific function, the power control unit further sets a short term power limit corresponding to the specific function, and the power control unit controls the power consumption of the processor so that a short-term moving average value of the power consumption of the processor will not exceed the short term power limit.

Further, the above information processing apparatus may be such that when setting the rated power corresponding to the specific function, the power control unit further sets the maximum instantaneous power corresponding to the specific function, and the power control unit controls the power consumption of the processor so that an instantaneous value of the power consumption of the processor will not exceed the maximum instantaneous power.

Further, the above information processing apparatus may be such that the rated power corresponding to the specific function is a value so determined that power consumption related to the specific function falls within a range of power consumption values changing significantly according to changes in set power to the processor.

A control method according to the third aspect of the present disclosure is a control method for an information processing apparatus including a processor with variable rated power, the control method including a power control step executed by the information processing apparatus to control the power consumption of the processor, wherein the power control step includes a step in which when processing based on a specific application as an application program to implement a specific function is executed in the foreground, rated power corresponding to at least the specific function is set.

A control method according to the fourth aspect of the present disclosure is a control method for an information processing apparatus including a processor connected to a device to input and output predetermined information and whose rated power is variable, the control method including a power control step executed by the information processing apparatus to control the power consumption of the processor, wherein when the execution of a specific application as an application program to implement a specific function is detected and the device works, more rated power than that when the device does not work is set in the power control step.

The above-described aspects of the present disclosure can consume power more effectively.

DETAILED DESCRIPTION OF THE DISCLOSURE

Figure 1:
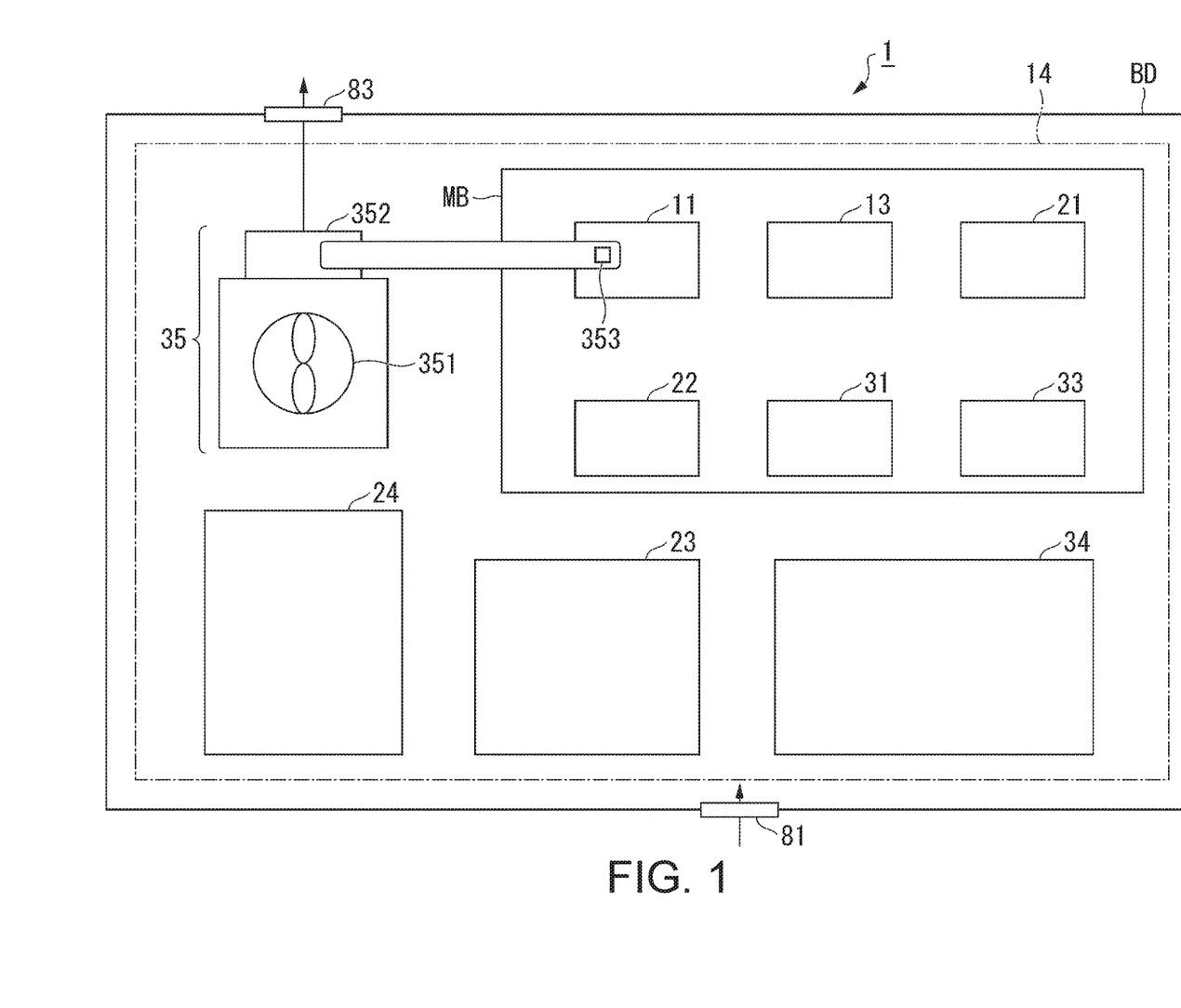
FIG. 1 is a plan view illustrating an internal configuration example of an information processing apparatus according to one or more embodiments. an embodiment.

Embodiments will be described below with reference to the accompanying drawings. First, the outline of an information processing apparatus 1 according to one or more embodiments will be described. FIG. 1 is a plan view illustrating an internal configuration example of the information processing apparatus 1 according to the present embodiment. FIG. 1 schematically illustrates the inside of a chassis BD of the information processing apparatus 1. The chassis BD stores various components. Inside the chassis BD, a motherboard MB, a storage device 23, an audio system 24, a battery 34, and a cooling unit 35 are arranged. On the motherboard MB, a processor 11, a video subsystem 13, a chipset 21, a BIOS memory 22, an EC 31, and a power supply circuit 33 are placed.

The cooling unit 35 is provided to cool down the information processing apparatus 1. The cooling unit 35 includes a cooling fan 351, a heat pipe 352, and a temperature sensor 353. The cooling fan 351 and the heat pipe 352 are an example of a thermal diffusion device. The cooling fan 351 has a motor to rotate fins (blades) in order to make air flow from an intake port 81 into the chassis BD. The inflow air exchanges heat with the heat pipe 352, and is discharged outside the chassis BD from an exhaust port 83. For example, the operation of the cooling fan 351 can be controlled by the EC 31 or any other device.

The heat pipe 352 has an evaporation section and a condensation section. The evaporation section of the heat pipe 352 is provided, for example, in proximity to or in contact with the processor 11 so that heat generated in the processor 11 can be taken in. The condensation section of the heat pipe 352 is provided in the vicinity of the cooling fan 351.

The evaporation section of the heat pipe 352 receives heat generated by the processor to evaporate a working fluid. Since pressure rises in the evaporation section due to the evaporation of the working fluid, the gas-phase working fluid moves toward the condensation section. In the condensation section, the heat of the working fluid is removed by an air flow produced by the cooling fan 351. The air flow after removing the heat from the working fluid is discharged outside the chassis BD from the exhaust port 83. The working fluid from which the heat is removed in the condensation section is condensed into a liquid phase. The liquid-phase working fluid flows toward the evaporation section by a capillary force through a wick. The liquid-phase working fluid that reached the evaporation section receives heat from the processor 11 to evaporate again. After that, the above phenomenon is repeated. Thus, the processor 11 can be cooled down by the cooling unit 35 equipped with the heat pipe 352.

The temperature sensor 353 detects temperature and outputs, to the EC 31, a temperature signal indicative of the detected temperature. The temperature sensor 353 is provided in a position capable of detecting the temperature of a site corresponding to the evaporation section of the heat pipe 352. The temperature detected by the temperature sensor 353 generally corresponds to the temperature of the processor 11.

Figure 2:
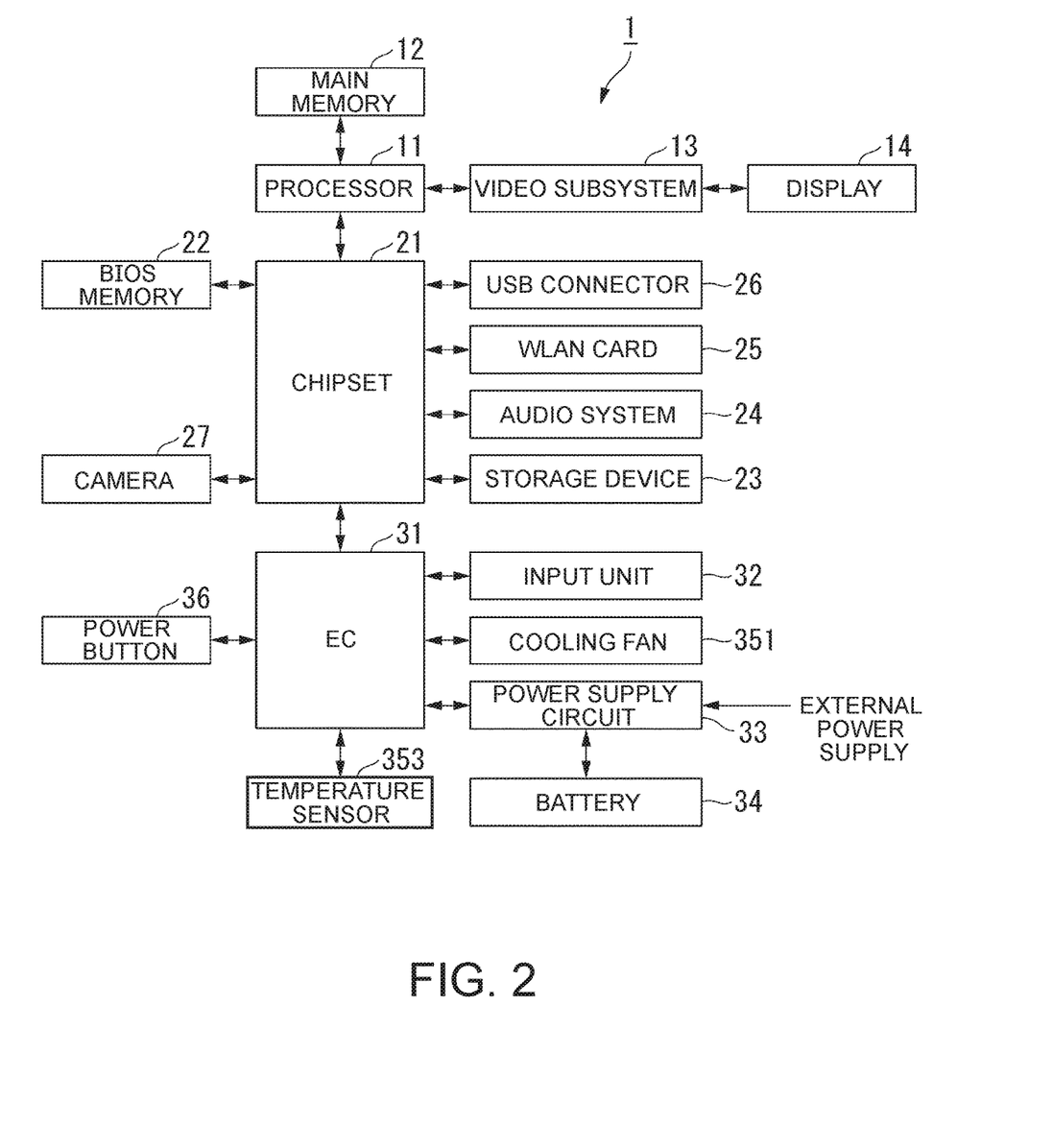
FIG. 2 is a schematic block diagram illustrating a hardware configuration example of the information processing apparatus according to one or more embodiments.

Next, a main hardware configuration example of the information processing apparatus 1 according to the present embodiment will be described. FIG. 2 is a schematic block diagram illustrating a hardware configuration example of the information processing apparatus 1 according to the present embodiment. The information processing apparatus 1 includes the processor 11, a main memory 12, the video subsystem 13, a display 14, the chipset 21, the BIOS memory 22, the storage device 23, the audio system 24, a WLAN card 25, a USB connector 26, a camera 27, the EC 31, an input unit 32, the power supply circuit 33, the battery 34, and the cooling unit 35 (the illustration of the heat pipe 352 omitted).

The processor 11 executes various kinds of arithmetic processing instructed by commands written in software (program). The processing executed by the processor 11 includes writing of data to the storage device 23 or reading data from the storage device 23, and the like. In the processor 11, at least one CPU is included. The CPU controls the operation of the entire information processing apparatus 1. For example, the CPU executes processing based on software such as an OS (Operating System), a BIOS, an application program (which may also be called an "app" in the present application), and the like. Note that executing processing instructed by commands written in software may also be referred to as "running software."

The main memory 12 is a writable memory used as reading areas of execution programs of the processor 11 or working areas to which processing data of the execution programs are written. The main memory 12 is composed, for example, of plural DRAM (Dynamic Random Access Memory) chips. The execution programs include the OS, various drivers for hardware-operating peripheral devices, various services/utilities, apps, and the like.

The video subsystem 13 is a subsystem for realizing a function related to image display, which includes a video controller. The video controller processes a drawing command from the processor 11, writes processed drawing information into a video memory, and reads this drawing information from the video memory to output the drawing information to the display 14 as display data indicative of display information (image processing). The video subsystem 13 may also be configured to include one or more GPUs (Graphic Processing Units). The GPU is a processor mainly responsible for real-time image processing and other parallel arithmetic processing. The GPU may share some processing with the CPU. The GPU may be integrated with the CPU functioning as the processor 11 and formed in the same core, or may be formed in a core separately from the CPU. The GPU may not only execute parallel arithmetic processing other than image processing but also share some processing with the CPU.

The display 14 displays a display screen based on drawing data (display data) output from the video subsystem 13. For example, the display 14 may be any display such as a liquid crystal display (LCD) or an OLED (Organic Light Emitting Diode) display.

The chipset 21 includes plural controllers to make plural devices connectable so that various data can be input and output to and from the plural devices. Each of the controllers is, for example, any one of bus controllers such as USB (Universal Serial Bus), serial ATA (AT Attachment), an SPI (Serial Peripheral Interface) bus, a PCI (Peripheral Component Interconnect) bus, a PCI-Express bus, and an LPC (Low Pin Count), or a combination thereof. As the plural devices, for example, the BIOS memory 22, the storage device 23, the audio system 24, the WLAN card 25, the USB connector 26, the camera 27, and the EC 31 to be described below are included. Any other auxiliary storage device such as an HDD (Hard Disk Drive) may also be connected to the chipset 21.

The BIOS (Basic Input Output System) memory 22 is configured, for example, by an electrically rewritable nonvolatile memory such as an EEPROM (Electrically Erasable Programmable Read Only Memory) or a flash ROM. The BIOS memory 22 stores system firmware such as a BIOS, firmware for controlling the operation of the EC 31 and other devices, and the like.

The storage device 23 is an auxiliary storage device configured by an electrically rewritable nonvolatile memory. The storage device 23 stores various data used in processing of the processor 11 and other devices or acquired by the processing, various programs, and the like. For example, the storage device 23 may be any one of an SSD (Solid State Drive), an HDD (Hard Disk Drive), and the like, or any combination thereof.

A microphone and a speaker (not illustrated) are connected to the audio system 24 to record, play back, and output voice data. Note that the microphone and the speaker may be incorporated, for example, in the information processing apparatus 1, or may be provided as an entity separate from the information processing apparatus 1.

The WLAN (Wireless Local Area Network) card 25 is connected to a network through wireless LAN to perform data communication.

The USB connector 26 is a connector for connecting peripheral devices using USB.

The camera 27 captures an image of an object therearound and acquires image data representing the captured image. The camera 27 captures a moving image or a still image. For example, the camera 27 may also be a USB camera connected via the USB connector 26.

The EC (Embedded Controller) 31 is a one-chip microcomputer which monitors and controls various devices (peripheral devices, sensors, and the like) regardless of the system operating state of the information processing apparatus 1. The EC 31 includes a CPU, a ROM, a RAM, multi-channel A/D input terminal and D/A output terminal, a timer, and digital input/output terminals (not illustrated). For example, the input unit 32, the power supply circuit 33, the cooling fan 351, and the like are connected to the digital input/output terminals of the EC 31 so that the EC 31 can control the operation of these units.

Further, the EC 31 may perform control such as to change the clock frequency of the processor 11 via the chipset 21 in order to control power consumption. In the control of power consumption, the EC 31 determines necessity of power supply to each unit and determines power supply (voltage, current, and the like) if necessary.

The input unit 32 includes, for example, input devices such as a keyboard and a touch pad to detect user operations and output, to the EC 31, operation signals according to the detected operations. The input unit 32 may also be configured as a touch sensor superimposed on the display 14 illustrated in FIG. 1.

The power supply circuit 33 includes, for example, a DC/DC converter, a charge/discharge unit, an AC/DC adapter, and the like. For example, the power supply circuit 33 converts DC voltage supplied from an external power supply through the AC/DC adapter or from the battery 34 into plural voltages required to operate the information processing apparatus 10. The power supply circuit 33 detects the presence or absence of power supply from the external power supply to the own apparatus using a known method to control power supply from the external power supply to the battery 34 and the consumption of power stored in the battery 34 in case of shortage of power supply from the external power supply. Further, the power supply circuit 33 supplies power to each unit of the own apparatus under the control of the EC 31. The power supply circuit 33 outputs, to the EC 31, power supply information indicative of the presence or absence of power supply from the external power supply. The EC 31 may also notify the processor 11 of the power supply information input from the power supply circuit 33.

The battery 34 is a secondary battery such as a lithium battery. When power is supplied from the external power supply to the information processing apparatus 1, the battery 34 is charged through the power supply circuit 33, while when power is not supplied from the external power supply to the information processing apparatus 1, the battery 34 supplies the stored power through the power supply circuit 33 as the operating power of the information processing apparatus 1.

A power button 36 performs control to either one of power on and power off as a state of power supply to the entire information processing apparatus 1 each time a pressing operation is accepted. When a pressing operation is accepted, the power button 36 outputs, to the EC 31, a pressing signal indicative of pressing. When the information processing apparatus 1 is in the power-off state and the pressing signal is input from the power button 36, the EC 31 causes the power supply circuit 33 to start power supply to each device of the information processing apparatus 1 (power on). When detecting the start of power supply to the own unit, the processor 11 reads the BIOS from the BIOS memory 22 and loads the read BIOS into the main memory 12 to execute boot processing (boot) according to the BIOS. In the boot processing, the processor 11 loads, into the main memory 12, data saved in the storage device 23. After that, the processor 11 boots the OS, and starts the execution of device drivers related to control of devices such as the storage device 23 after completion of booting of the OS.

On the other hand, when the information processing apparatus 1 is powered on and the pressing signal is input from the power button 36, the EC 31 causes the processor 11 to execute shutdown processing (shutdown). In the shutdown processing, the processor 11 saves data existing in working areas at the time into the storage device 23 or any other auxiliary storage device. After completion of data saving, the processor 11 stops processing by apps, device drivers for the storage device 23 and the like, and other programs being executed at the time. After that, the processor 11 notifies the EC 31 of the completion of the shutdown processing. The EC 31 causes the power supply circuit 33 to stop power supply to each device of the information processing apparatus 1.

Although power of a constant voltage is supplied to the processor 11 from the power supply circuit 33, power consumption is variable in general. The processor 11 may make either or both of an operating voltage and an operating frequency variable according to the power consumption. For example, the processor 11 executes the system firmware to set, in a register included in the processor 11, the operating state (operating mode) of the main system of the information processing apparatus 1 or the maximum operating frequency allowed depending on the power control mode. The main system is a computer system configured to include the hardware such as the processor 11, the main memory 12, and the video subsystem 13, and software such as the OS and a Task Scheduler. The processor 11 executes the OS in collaboration with the main memory 12 or any other hardware to provide the basic functionality of the information processing apparatus 1. For example, the basic functionality includes running state management and control of various apps and other programs, providing of standard interfaces for these running programs, resource management in the main system and hardware in direct or indirect collaboration with the main system, and the like.

When the operating frequency at the time is higher than the set maximum operating frequency, the processor 11 changes the operating frequency step by step to make the operating frequency equal to or less than the set maximum operating frequency. When reducing the operating frequency, the processor 11 may also reduce the operating voltage up to a value required for the operation of the own unit at the operating frequency (speed step). This reduction in the operating voltage results in reducing the power consumption of the processor 11. In other words, the processor 11 can increase the maximum allowed power consumption by increasing either or both of the operating voltage and the operating frequency.

Further, the processor 11 may perform intermittent operation by repeating working and stopping at predetermined cycles, respectively, to make the average processing speed variable (throttling). Throttling setting information indicating whether or not the throttling is effective and the duty ratio (throttling rate) may be made respectively settable by the system firmware in the register of the processor 11. The processing power of the processor 11 can also be changed step by step by the throttling. Each change in processing power causes a change in power consumption and hence a change in amount of heat generation.

The processor 11 may also use the speed step and the throttling together to execute the throttling while maintaining the lowest operating frequency by the speed step. In other words, the processor 11 can set the maximum power consumption allowed by the set operating frequency.

The processor 11 performs the throttling to change the processing power of the own unit to that at any stage of predetermined plural stages. The processor 11 can increase power consumption as the throttling rate increases.

In the following description, the processing power of the processor 11 or the stage thereof that can be variably set by either or both of the speed step and the throttling may also be called a "performance step." The large the value of the performance step, the higher the processing power will be. The power consumption increases as the processing power increases. For example, when the value of the performance step is 100%, it indicates an operating state where the performance is maximized without reducing the processing power.

The processor 11 or the EC 31 may also include a TCC (Thermal Control Circuit; temperature control circuit). For example, the TCC monitors the temperature detected by the temperature sensor 353, and when the load increases to make the detected temperature rise more than a predetermined reference temperature, the operation of the processor 11 is controlled to suppress the temperature rise by executing any one of the operations to reduce the operating frequency, the operation to reduce the operating voltage, and the intermittent operation, or any combination thereof.

In general, since the power consumption of the processor 11 is higher as the performance step is higher and the utilization rate is higher, the amount of heat generation increases. The processor 11 sets a performance step corresponding to the power consumption equal to or less than the maximum power consumption allowed at each stage so that the power consumption becomes equal to or less than the set maximum power consumption. Therefore, the execution time of each process becomes longer as the performance step is stepped down, and hence the power consumption decreases. Heat generated by the processor 11 not only raises the temperature thereof but also raises temperatures inside and outside of the chassis BD. However, since the amount of heat generation is reduced as the power consumption is reduced, when the power consumption is sufficiently low, the stop of a heat dissipation mechanism such as the cooling fan 351 or an output decrease is allowed. On the contrary, when the power consumption is high, the operation of the cooling fan 351 or an output increase is required.

Figure 3:
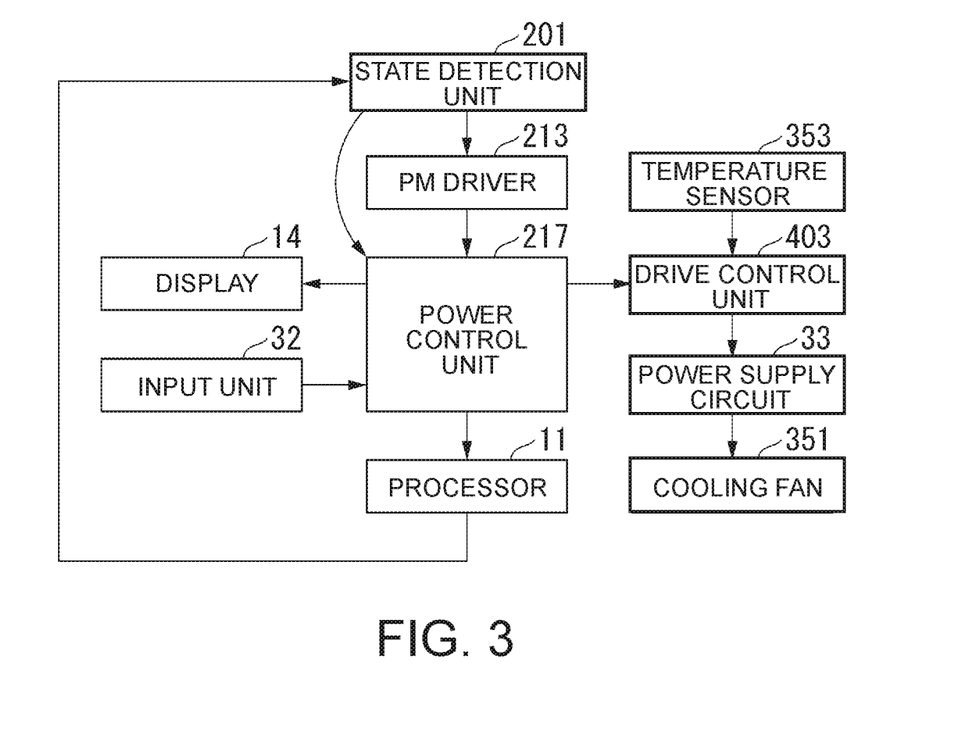
FIG. 3 is a schematic block diagram illustrating a functional configuration example of the information processing apparatus according to one or more embodiments.

Next, a performance control system in the information processing apparatus 1 to control the performance thereof will be described. The performance control system is configured to include a state detection unit 201, a PM driver 213, and a power control unit 217 (FIG. 3).

The state detection unit 201 performs its functionality in collaboration with a service application 211 (not illustrated) executed by the processor 11 on the OS, an intermediate driver incorporated in the kernel of the OS, and other drivers to detect the state of the processor 11. By running the intermediate driver, a process generated in the processor 11 by running the kernel of the OS, and a program running state in the process are monitored. The state detection unit 201 may also identify whether the app running state in each individual process is running in the foreground (hereinafter, which may also be called "foreground execution") or in the background (which may also be called "background execution"). Screen displays of individual apps executed on the OS are provided in windows corresponding to the respective apps (multiwindow system). The running state of an app corresponding to a screen display displayed with the highest priority among these screen displays corresponds to the foreground execution. When running the kernel of the OS, the running state of an app the execution of which is most recently started by running the kernel is determined to be the foreground execution, and the screen display thereof is prioritized over screen displays of the other apps. The running states of the other apps are determined to be the background execution. Further, among apps whose running states are determined as the background execution, the kernel determines the running state of an app, instructed with an operation in a window in which the screen display of the app is provided, to be the foreground execution, and prioritizes the screen display over the screen displays of the other apps. Therefore, among image processing targets by the processor 11, image processing related to the screen display of the app the running state of which is the foreground execution becomes the main target.

The service application 211 is a state monitoring program executed by the processor 11 to mainly monitor the state of the processor 11 itself, which provides some of the functionality of the state detection unit 201. For example, the service application 211 acquires, from the OS, information on the power consumption of the processor 11.

The service application 211 may also acquire parameters such as the average utilization rate of the processor 11 in a predetermined monitoring period up to the time point, the presence or absence of user activity, the disk access time, and the like to identify the operating state using the acquired parameters. For example, based on the utilization rate of the processor 11, the parameter of power consumption, and the like, the service application 211 may recognize the execution start and execution end of tasks of apps and other programs. The service application 211 can refer to boot application information every predetermined time (for example, every 0.1 to 1.0) to identify boot, i.e., an app that starts running, and exit, i.e., an app that exits from running. The boot application information indicative of the boot of the app and the exit of the app can be an element of processor state information indicative of the state of the processor 11.

The service application 211 outputs, to the PM driver 213, the detected processor state information indicative of the state of the processor 11.

Note that the state detection unit 201 waits for input of power supply information from the EC 31, and outputs the input power supply information to the power control unit 217.

The PM (Power Management) driver 213 extracts parameters indicative of a state related to the power consumption of the processor 11 from various parameters of the processor state information input from the service application 211 of the state detection unit 201. The PM driver 213 outputs the processor state information including the extracted parameters to the power control unit 217 and the EC 31. Note that it is common that the amount of required calculation differs greatly depending on the application. Therefore, the boot application information can be parameters related to power consumption.

The power control unit 217 controls the processing power of the processor 11 based on the processor state information input from the PM driver 213 or setting information set according to user operations detected by the input unit 32. In the process of control of the processing power, the power consumption is controlled. For example, the power control unit 217 may also provide some functions obtained by the processor 11 executing the system firmware.

Note that there are a first power limit (hereinafter called the "PL1") and a second power limit (hereinafter called the "PL2") as the parameters (hereinafter the set power parameters) related to control of the processing power of the processor. The PL1 corresponds to rated power. The PL1 is a threshold value that limits the power consumption of the processor 11 to not exceeding this value continuously for a predetermined time or longer though allowing the power consumption of the processor 11 to exceed this value temporarily. The PL1 is also called a long term power limit. The PL2 is a threshold value that limits the power consumption to not exceeding this value even temporarily. The PL2 is also called a short term power limit. The PL2 corresponds to the upper limit of the power consumption of the processor 11 when the performance step is 100%. Note that when the processor 11 includes plural arithmetic processing units, the PL1 and the PL2 may be set for each individual arithmetic processing unit, respectively.

The power control unit 217 can control the power consumption of the processor 11 based on the PL1 and the PL2. For example, when the time during which the power consumption of the processor 11 exceeds the PL1 continues for a predetermined duration $\tau$ (for example, 0.2 to 1[s]) or more, the power control unit 217 reduces the performance step set in the register of the processor 11 until the moving average value of the power consumption becomes equal to or less than the PL1. Further, the power control unit 217 increases the performance step set in the register of the processor 11 at the time as long as the moving average value of the power consumption does not exceed the PL1.

Figure 5:
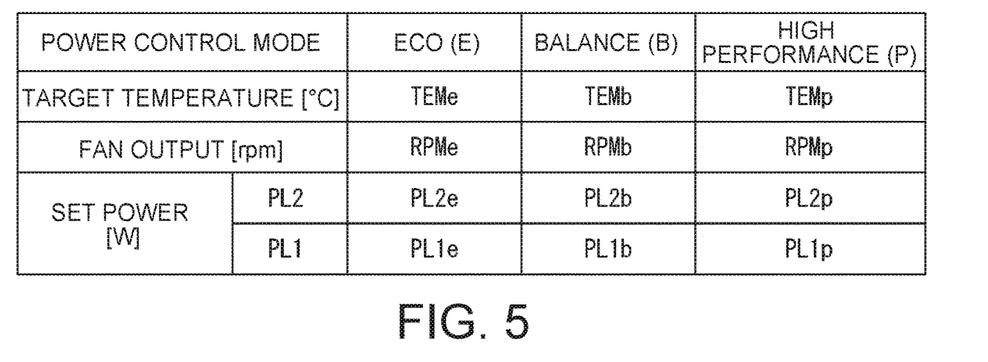
FIG. 5 is a diagram illustrating an example of a power control table according to one or more embodiments.

The power control unit 217 may also control the power consumption of the processor 11 by the above method using the set power parameters indicated in any one power control mode among predetermined plural power control modes. In other words, the processor 11 can take on the plural power control modes different in rated power from one another. A power control table may also be prestored in the register of the processor 11 or the main memory 12. As illustrated in FIG. 5, the power control table is configured to include set power parameters for each of the plural power control modes.

Figure 4:
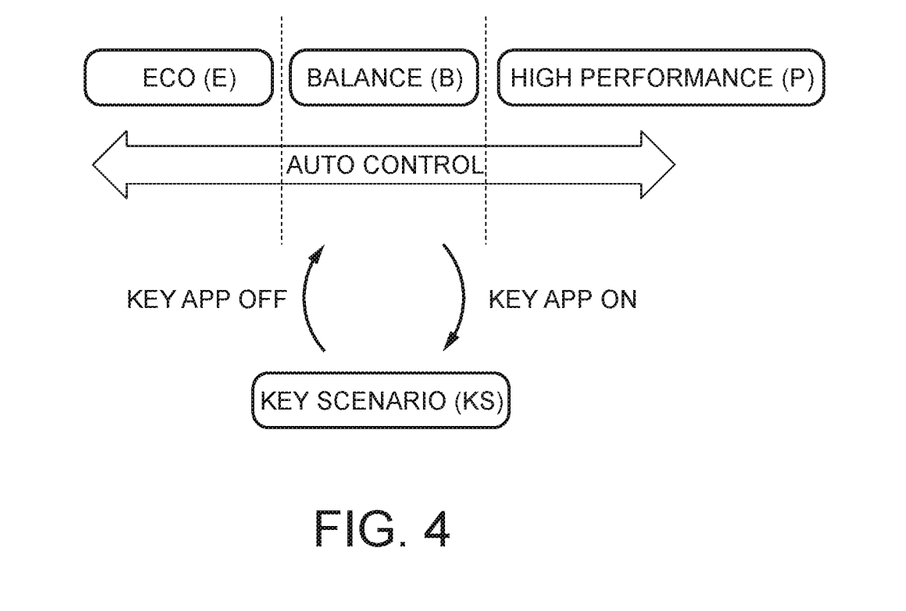
FIG. 4 is an explanatory diagram illustrating a transition example of power control modes according to one or more embodiments.

The plural power control modes include N-stage dynamic control modes, where N is an integer of 2 or more, (hereinafter, may also be called "DC modes"), and one or more specific function modes. In the present application, each specific function mode may also be called a "key scenario." The DC modes can also be regarded as default power control modes selectable when no specific function or no app is specified. The N-stage DC modes are different in rated power (PL1) from one another. The PL2 may be common among the N-stage DC modes or different among the N-stage DC modes. The power control unit 217 may identify a one-stage DC mode among the N-stage DC modes according to a user operation, or may identify any one-stage DC mode according to the state of the processor 11. As illustrated in FIG. 4, a method of identifying any one-stage DC mode from among the N-stage DC modes according to the state of the processor 11 may also be called an "auto control mode." The power control unit 217 may also select the auto control mode according to a user operation. The power control table illustrated in FIG. 5 illustrates the PL1 and the PL2 as a set of parameters related to each of 3-stage DC modes, respectively. In FIG. 4 and FIG. 5, eco mode (E), balance mode (B), and high performance mode (P) correspond to DC modes, respectively.

When the auto control mode is set, the power control unit 217 selects one DC mode from the N-stage DC modes according to a changing trend of the state of the processor 11. When an excess period as a period during which the power consumption of the processor 11 continues to exceed first reference power becomes a predetermined first period (for example, 5 to 10 seconds) or more, the power control unit 217 changes the DC mode from any stage DC mode of not less than the first stage and not more than the n-th stage to the n+1-th stage DC mode. In a mode transition table illustrated in FIG. 8, each of SPeb and SPbp corresponds to the first reference power related to the determination from eco mode (E) to balance mode (B), or from balance mode (B) or eco mode (E) to high performance mode (P), respectively. Each of SPeb and SPbp can be a value lower by a predetermined determination width (for example, 0.3 to 1[W]) than the PL1 in the eco mode (E) or the PL1 in the balance mode (B), respectively. Each of Teb and Tbp corresponds to a first period related to the determination from the eco mode (E) to the balance mode (B), or from the balance mode (B) or the eco mode (E) to the high performance mode (P), respectively. Teb and Tbp can be typically 5 to 30 seconds.

When an intra-reference period as a period during which the power consumption of the processor 11 continues to be second reference power or less becomes a predetermined second period or longer, the power control unit 217 changes the DC mode from any stage DC mode of not less than the n+1-th stage and not more than the n-th stage at the time to the n-th stage DC mode. In the mode transition table illustrated in FIG. 8, each of SPbe and SPpb corresponds to a second period related to the determination from the balance mode (B) or the high performance mode (P) to the eco mode (E), or from the high performance mode (P) to the balance mode (B), respectively. Each of SPbe and SPpb can be a value lower by a predetermined determination width (for example, 0.3 to 1 [W]) than the PL1 in the balance mode (B) or the PL1 in the high performance mode (P), respectively. The second reference power related to the n+1-th stage DC mode may be equal to or lower than the first reference power related to the n+1-th stage DC mode. Further, the second reference power related to the n+1-th stage DC mode needs only to be a value larger than that of the first reference power related to the n-th stage DC mode. Further, the second period may be equal to the first period or longer than the first period. By making the second reference power smaller or making the first period longer, the change to a lower stage DC mode is made to be more difficult than the change to a higher stage, that is, to a DC mode the PL1 of which is larger. Therefore, it can be prepared for an unexpected increase in power consumption. The mode transition table may be pre-stored in the register of the processor 11 or the main memory 12 separately from the power control table.

The mode transition table is configured to include information indicative of mode transition conditions or mode transition parameters for each power control mode after changed. The first reference power, the first period, the second reference power, and the second period mentioned above correspond to the mode transition conditions. The power control unit 217 can refer to the mode transition table to determine, to be a power control mode as a transition destination, a power control mode corresponding to any one of the mode transition conditions that the state of the processor 11 satisfies. When two or more mode transition conditions are satisfied, the power control unit 217 selects any one of the mode transition conditions according to a predetermined priority order. The power control unit 217 changes the power control mode to a power control mode as the transition destination related to the selected mode transition condition. In the mode transition table illustrated in FIG. 8, the higher the priority of the mode transition condition, the more ahead it will be placed.

Figure 8:
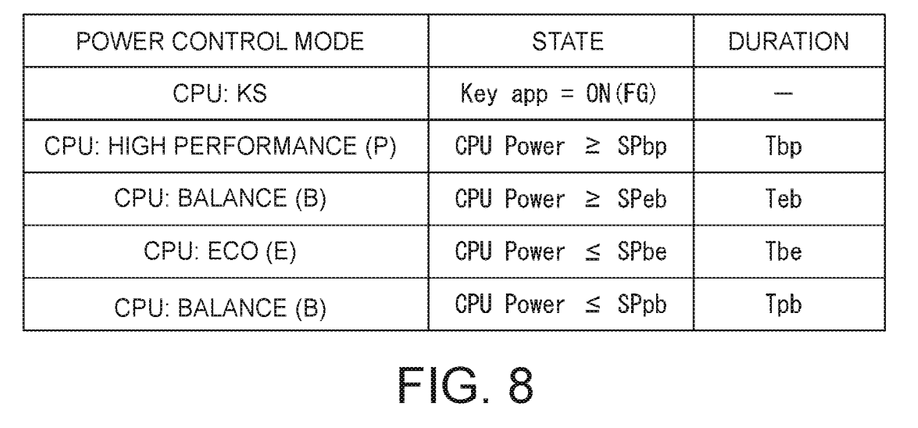
FIG. 8 is a diagram illustrating an example of a mode transition table according to embodiments.

Note that when there is no mode transition condition that the state of the processor 11 satisfies (floating state (float)) in the mode transition table, the power control unit 217 may keep the power control mode of the processor 11 at the time unchanged.

Figure 6:
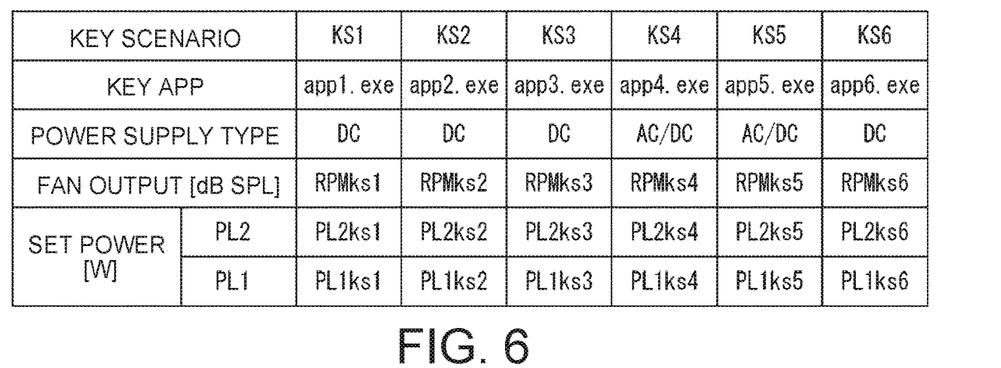
FIG. 6 is a diagram illustrating another example of the power control table according to one or more embodiments.

In FIG. 8, KS indicates a specific function mode. The specific function mode is a power control mode used to realize a specific function. The specific function corresponds to a function used by many users. In the present application, the specific function may also be called a "key scenario." As the key scenario, for example, there are local picture playback, video streaming playback, content browsing, unified communication, video editing, document editing, and the like. Each of these functions is provided by executing a specific app (hereinafter, which may also be called a "key app"). In the power control table, information on each key app is set for each key scenario as illustrated in FIG. 6. The power control unit 217 can determine the execution start and execution end of a key app by referring to the power control table to determine whether or not an app related to the execution start indicated in the boot application information corresponds to a predetermined key app. In the mode transition table illustrated in FIG. 8, a specific function mode that satisfies an applicable condition is applied with the highest priority, and the foreground execution of a key app is indicated as the applicable condition.

Figure 7:
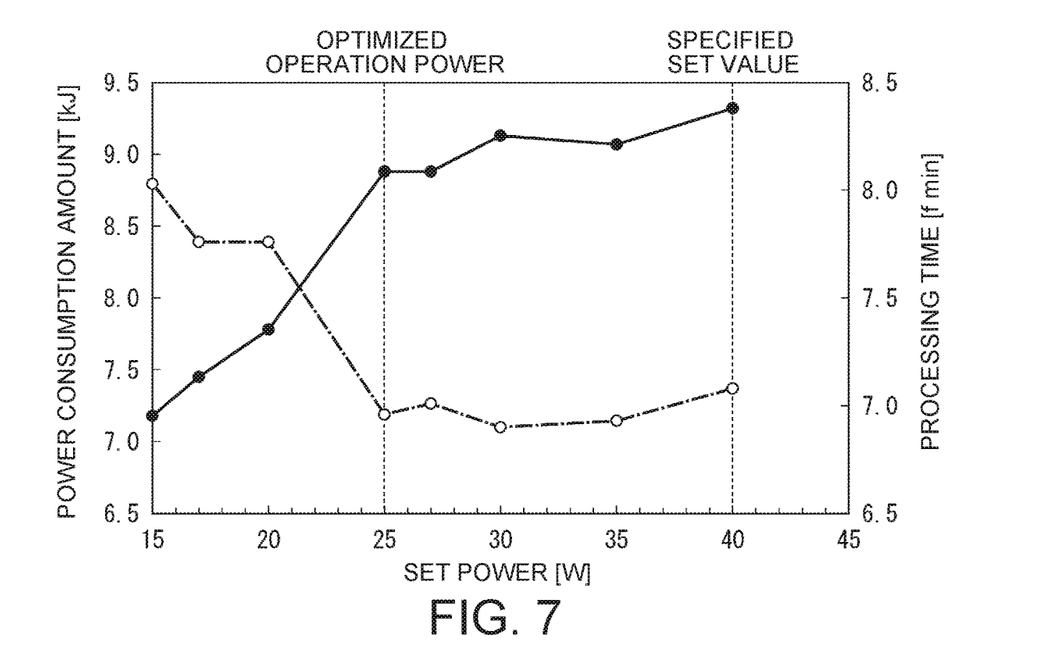
FIG. 7 is an explanatory graph illustrating an example of processing power in a key scenario according to one or more embodiments.

In the power control table, the set power parameters are preset for each key scenario. At least the PL1 is included in the set power parameters. Each of the set power parameters is a value so determined that the power consumption related to the operation of each key app falls within a range of power consumption values changing significantly according to changes in set power. In the following description, this set power may also be called the "optimized operating power." Here, the term "optimized" includes such meaning that the power is set for the purpose of effectively consuming the supplied power without being wasted, but it does not guarantee that the operating power is absolutely appropriate under any circumstances. The set power indicates power set in the processor 11, which is determined by the set power parameters PL1 and PL2, and the throttling rate derived in the performance step. The range of the optimized operating power varies from key scenario to key scenario. The range of the optimized operating power can also be different for each of key apps that play the same function. FIG. 7 illustrates the dependence of the amount of power consumption and the processing time in a certain key scenario on the set power. In the example of FIG. 7, during running the certain key app, when the set power increases from 20 W to 25 W, the amount of power consumption increases significantly and the processing time decreases significantly. Here, the set power of 25 W is set as the optimized operating power. In contrast, a specified set value illustrated becomes 40 W and exceeds the operating power. Therefore, power is likely to be wasted at the specified set value. In the present embodiment, the set power parameters are so preset that the set power to the processor 11 is set to fall within a range of predetermined, optimized operating power upon execution of a key app.

For example, the PL1 needs only to be determined within the range of the optimized operating power related to the key scenario. In this case, since the set power is also approximate to the PL1, the set power is more likely to fall within the range of optimized operating power.

In the power control table, both the PL1 and the PL2 may also be preset for each individual key scenario. For example, the PL1 may be determined as a value included in the range of optimized operating power, and the PL2 may be determined as the upper limit of optimized operating power or as a value that exceeds the upper limit but close to within a predetermined range from the upper limit. In this case, since the set power to the processor 11 does not exceed the PL2, the set power can be made to fall within the range of optimized operating power more reliably.

Further, fluctuations of the set power of the processor 11 can be reduced by setting the PL2 value to a value equal to the PL1 value. This is effective for a key scenario having a narrow range of optimized operating power. The power control unit 217 can refer to the power control table to identify the PL1 corresponding to the identified key app or both the PL1 and the PL2.

As for a specific key scenario, the power control unit 217 may apply a specific function mode during execution in the foreground and may not apply the specific function mode during execution in the background. Especially, for a key app with high power consumption during execution in the foreground, the power supply to the key app is prioritized. In the power control table, foreground execution may also be indicated as an applicable condition for the key app corresponding to the key scenario. The power control unit 217 can refer to the boot application information to determine whether or not an app indicated in the boot application information and the boot of which is started is the key app to which the specific function mode is to be applied, and whether or not foreground execution is an applicable condition. Then, the power control unit 217 can identify whether or not the execution state of the app indicated in the boot application information and the boot of which is started is foreground execution.

Further, in the specific key scenario, the power control unit 217 may apply the specific function mode when there is no power supply from the external power supply, and may not apply the specific function mode in the other cases. This is because power stored in the battery 34 is consumed when there is no power supply from the external power supply and hence there is a high need to suppress the power consumption. In the power control table, the power supply type may also be indicated as an applicable condition for the key app corresponding to the key scenario. As the power supply type, either or both of direct current (DC) and alternating current (AC) can be indicated. The direct current and the alternating current correspond to a state of no power supply from the external power supply and a state where there is power supply from the external power supply, respectively. The power control unit 217 can refer to the boot application information to determine whether or not the app indicated in the boot application information and the boot of which is started is the key app to which the specific function mode is to be applied, and whether or not the power supply type is an applicable condition. When the power supply type is the applicable condition, the power control unit 217 can determine whether or not the power supply state indicated in the power supply information matches the supply state indicated by the power supply type.

FIG. 6 illustrates another example of the power control table. FIG. 6 illustrates a key app, a power supply type, fan output, and set power (PL1, PL2) for each of six key scenarios. For example, for key scenario KS1, key app appl.exe, power supply type DC, fan output RPMks1, and set power PL1ks1 and PL2ks1 are set. The setting of AC/DC in the item of power supply type indicates that it is applied regardless of the presence or absence of power supply from the external power supply. However, in the example of FIG. 6, foreground execution is not set in the power control table as a setting on the assumption that foreground execution is included as the applicable condition in all of the key scenarios.

Note that when some or all of the set items (for example, fan output) of the specific function mode for a certain key scenario (for example, KS1) are common to the set items of any other power control mode (for example, eco mode (E)), a link symbol may also be set to indicate that the set items are common. When the boot of a corresponding key app is detected, the power control unit 217 refers to set items in the corresponding set items of the other power control mode as the link destination.

Further, as illustrated in FIG. 5 and FIG. 6, the power control tables may be configured separately for the DC mode and the specific function mode, or both may be integrally configured.

Note that in the present embodiment, the power control unit 217 may give priority to the power control mode selected according to an operation over the DC mode selected by the auto control mode, and may give higher priority to a specific function mode that satisfies applicable conditions according to a key scenario the execution of which is started. In the example of FIG. 4, any one of the eco mode (E), the balance mode (B), and the high performance mode (P) is selected by the auto control mode based on the changing trend of the power consumption of the processor 11. Under this situation, when a key app is booted (key app ON), a specific function mode related to the key app is selected (key scenario (KS)). When the execution of the key app is ended (key app OFF), the specific function mode related to the key app is canceled and returned to the auto control mode. When two or more key apps are executed in parallel, a specific function mode related to any one of the key apps, for example, a specific function mode related to a key app being executed in the foreground, is selected.

The power control unit 217 refers to the power control table to identify the PL1 and the PL2 as set power parameters related to the power control mode at the time. The power control unit 217 can determine the performance step mentioned above using the identified PL1 and PL2 to control the power consumption of the processor 11.

The power control unit 217 outputs, to a drive control unit 403, power control mode information indicative of the determined power control mode.

A PD (Power Delivery) controller that constructs part of the EC 31 controls power to be supplied to the DC/DC converter of the power supply circuit 33 based on the processor state information input from the PM driver 213. The PD controller adds the amount of consumption due to power conversion in the DC/DC converter or the like and other factors to the total power as the total value of power consumption required in respective devices to determine total power, and outputs, to an AD adapter, a power request signal indicative of the determined total power. The total power includes the power consumption of the processor 11 indicated in the operating state information. The AD adapter converts AC power supplied to the own apparatus from the external power supply into DC power. The AD adapter supplies the total amount of DC power, indicated by the power request signal input from the PD controller, to the information processing apparatus 1. The information processing apparatus 1 and the AD adapter are connected through a USB cable of transmitting various data for example, according to the USB 3.2 standard. The USB cable has a signal line and a power line.

Next, a temperature control system according to the present embodiment will be described. The drive control unit 403 (FIG. 3) that constructs part of the EC 31 determines the operating state of the cooling fan 351 based on the power control mode indicated in the power control mode information input from the power control unit 217 and temperature indicated by temperature data input from the temperature sensor 353. The drive control unit 403 refers to a preset temperature control table to determine the amount of operation according to the power control mode and the temperature. The drive control unit 403 generates a drive control signal indicative of the determined amount of operation, and outputs the generated drive control signal to the power supply circuit 33.

The temperature control table is configured to include one or more stages, each composed of a set of the amount of operation of the cooling fan 351 and a target temperature, for each power control mode. The target temperature is such a temperature as to instruct the power supply circuit 33 to start operation with the operation amount corresponding to the target temperature when the temperature detected by the temperature sensor 353 tends to rise and reaches the temperature. In the power control mode at the time, when the temperature exceeds the target temperature at that stage, the drive control unit 403 determines the amount of operation corresponding to the target temperature. In the power control mode at the time, when the temperature tends to drop and falls below a temperature lower by a predetermined drop amount (for example, 2 to 3 [° C.]) than the target temperature at that stage, the drive control unit 403 determines the amount of operation corresponding to a target temperature one stage lower than the target temperature at that stage. Note that when there is no output corresponding to the one-stage lower target temperature, that is, when an operation amount at the zero stage is determined, the drive control unit 403 determines to stop operation and outputs, to the power supply circuit 33, a drive control signal indicative of stop. Note that the temperature control table may be configured independently of the power control table, or may be integrally configured. The power control table illustrated in FIG. 5 is configured integrally with the temperature control table. In this power control table, the fan output and the target temperature are set for each power control mode in addition to the PL1 and the PL2 as set power. However, the number of sets of operation amounts and target temperatures is one stage for each power control mode.

The power supply circuit 33 supplies, to the cooling fan 351, power corresponding to the amount of operation indicated by the drive control signal input from the drive control unit 403. The amount of heat generation of the main system depends mainly on the amount of heat generation of the processor 11 among electronic devices. The amount of operation of the cooling fan 351 is controlled based on temperature T and the power control mode to dissipate heat according to the temperature rise due to heat generation.

Next, a functional configuration example of the information processing apparatus 1 according to the present embodiment will be described.

FIG. 3 is a schematic block diagram illustrating a functional configuration example of the information processing apparatus 1 according to the present embodiment.

The state detection unit 201 monitors the state of the processor 11 and outputs, to the PM driver 213, processor state information indicative of the monitored state. As the state of the processor 11 to be monitored, for example, information such as the start of an app and the stop of the app, and foreground execution or background execution as the execution state is applied.

The state detection unit 201 waits for power supply information input from the EC 31, and outputs the input power supply information to the power control unit 217. As the power supply information, for example, information indicative of the presence or absence of power supply from the external power supply is included.

The PM driver 213 extracts parameters, indicative of a state associated with the power consumption of the processor 11, from the processor state information input from the state detection unit 201. The driver 213 outputs, to the power control unit 217 and the EC 31, the processor state information indicative of the extracted parameters.

The power control unit 217 refers to the power control table to perform auto control of power control modes based on the changing trend of power consumption indicated in the processor state information input from the PM driver 213. The power control unit 217 may display a power control mode setting screen on the display 14 to select a power control mode instructed by an operation signal input from the input unit 32.

The power control unit 217 refers to the power control table to select or cancel a specific function mode corresponding to a key app that satisfies the set applicable condition according to a change in the execution state of the key app indicated in the boot application information of the processor state information input from the state detection unit 201. As the applicable condition, the power control unit 217 determines whether or not either one or both of foreground execution and the presence or absence of power supply from the external power supply are satisfied as the execution state indicated in the boot application information.

The power control unit 217 outputs, to the drive control unit 403, the power control mode information indicative of the determined power control mode. Further, the power control unit 217 refers to the power control table to identify the PL1 and the PL2 as set power parameters corresponding to the determined power control mode and set the identified PL1 and PL2 in the register of the processor 11. The power consumption of the processor 11 is controlled based on the set PL1 and PL2.

The temperature sensor 353 measures temperature and outputs, to the drive control unit 403, temperature data indicative of the measured temperature.

The drive control unit 403 refers to the temperature control table to determine the amount of operation of the cooling fan 351 based on the power control mode input from the power control unit 217 and the temperature indicated by the temperature data input from the temperature sensor 353.

The drive control unit 403 generates a drive control signal indicative of the determined amount of operation, and outputs the generated drive control signal to the power supply circuit 33.

The power supply circuit 33 supplies, to the cooling fan 351, power corresponding to the amount of operation indicated by the drive control signal input from the drive control unit 403.

The cooling fan 351 operates by consuming the power supplied from the power supply circuit 33.

(Mode Transition Processing)

Next, an example of mode transition processing according to the present embodiment will be described.

Figure 9:
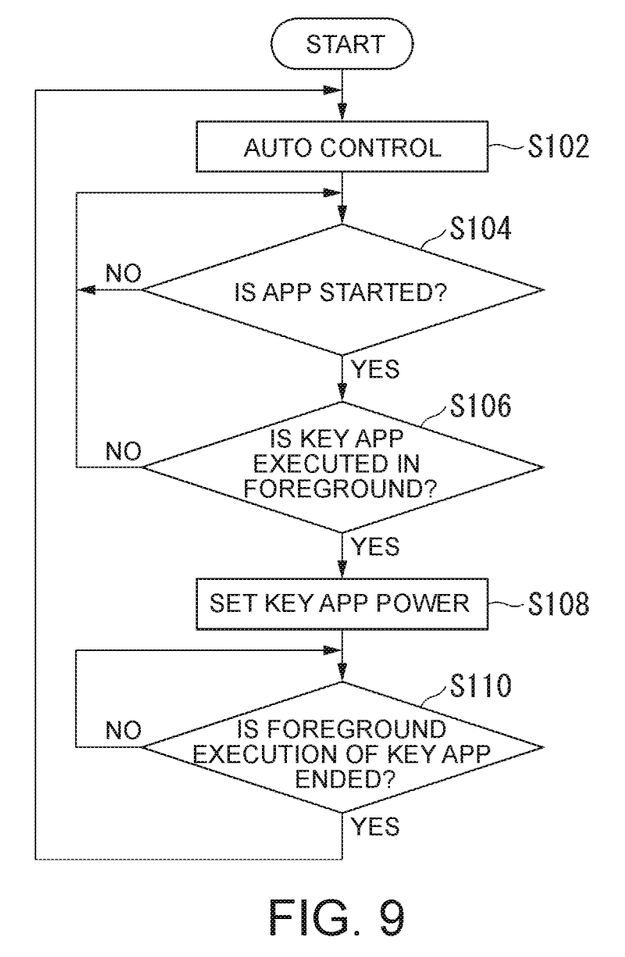
FIG. 9 is a flowchart illustrating an example of mode transition processing according to one or more embodiments.

FIG. 9 is a flowchart illustrating an example of mode transition processing according to the present embodiment. The processing illustrated in FIG. 9 is started when the power control unit 217 applies the auto control mode. Further, a case where all of the key apps include foreground execution as the applicable condition for the specific function mode is taken as an example.

(Step S102) The power control unit 217 applies the auto control mode to select one DC mode from among plural DC modes. The power control unit 217 refers to the mode transition table to identify a mode transition condition that the state of the processor 11 satisfies. When there are two or more identified mode transition conditions, one mode transition condition having the highest priority is identified. The power control unit 217 selects a DC mode as a transition destination related to the identified mode transition condition.

(Step S104) The power control unit 217 monitors input boot application information to determine the presence or absence of the execution start (boot) of an app. When the execution start of an app is determined (step S104: YES), the power control unit 217 proceeds to a process in step S106. On the other hand, when the execution start of an app is not determined (step S104: NO), the power control unit 217 repeats the process in step S104.

(Step S106) The power control unit 217 refers to the power control table to determine whether or not the app the execution of which is started corresponds to a key app. Further, the power control unit 217 determines whether or not the execution state indicated in the processor state information is foreground execution. For a key app with the power supply type set as an applicable condition in the power control table, the power control unit 217 determines whether or not the power supply type matches a power supply type with input power supply information set (for example, there is no power supply from the external power supply). When determining that the app the execution of which is started is a key app and the execution state is foreground execution (step S106: YES), the power control unit 217 proceeds to a process in step S108. On the other hand, when determining that the app the execution of which is started is not any key app, that the execution state is not foreground execution, and that the app does not satisfy any other applicable condition (step S106: NO), the power control unit 217 returns to the process in step S104.

(Step S108) The power control unit 217 determines a specific function mode related to the key app as the power control mode of the processor 11. The power control unit 217 sets, in the processor 11, the set power parameters related to the determined specific function mode (key app power settings).

(Step S110) The power control unit 217 monitors the boot application information to determine the presence or absence of the execution end of the key app. The power control unit 217 monitors the processor state information to determine whether or not the execution state is foreground execution. For a key app the power supply type of which is set as the applicable condition in the power control table, the power control unit 217 determines whether or not the power supply type matches the power supply type for which the input power supply information is set. When determining that the app the execution of which is ended is the key app, that the foreground execution as the execution state is ended, or that any other applicable condition is not satisfied (step S110: YES), the power control unit 217 returns to the process in step S102. In other cases (step S110: NO), the power control unit 217 repeats the process in step S110.

In the above description, the example of mainly using the PL1 and the PL2 as the set power parameters is taken, but the fourth power limit (PL4: Power Limit 4) may further be used. The PL4 corresponds to the maximum instantaneous power. In other words, the PL4 is a threshold value that limits an instantaneous value of the power consumption of the processor 11 to a value not exceeding this value even instantaneously (for example, for a short period of about several tens μs to several tens ms). The PL4 can be a value significantly larger than the PL2 smoothened in time.

In order to be able to supply more power instantaneously from the power supply circuit 33 to the processor 11, a power feeding device (charger, not illustrated) and a battery (not illustrated) separate from the battery 34 may further be provided in the chipset 21 or the EC 31 as a power supply mechanism. The power feeding device stores, in the separate battery, power supplied from the power supply circuit 33. The power control unit 217 supplies the power stored in the battery to the processor 11 according to an increase in the power consumption of the processor 11. The power control unit 217 can control the amount of power supplied from the battery to the processor 11 according to the PL4. The PL4 may be constant regardless of the power control mode, or may be set independently for each power control mode.

The PL4 for each individual power control mode may also be set in the power control table. For example, a larger value may be set for the PL4 related to a DC mode with a larger PL1 value. Further, necessity of setting the PL4 for each specific function mode and the set value may be different, respectively. This is because the frequency and degree of an instantaneous increase in power consumption differ depending on the specific function mode. The power control unit 217 can set, in the register of the processor 11, the PL4 corresponding to the power control mode selected at the time to realize control of power consumption further using the PL4. Note that the value of the PL4 may be larger than the upper limit of the optimized operating power as long as the power consumption of the processor 11 can be guided within the range of optimized operating power.

(Device State Reference)

Note that power consumption during execution may differ depending on the key scenario according to the state of a device that performs input/output of information in the function thereof. Here, the input/output means that either one of the input and the output may apply, or that both may apply. In such a key scenario, the power control unit 217 may also apply, to the state of the device, a specific function mode separate from that in the case where the state of the device is different from the state of any other device. For example, when the camera 27 works in unified communication, more power may be consumed due to control for the camera, acquisition of image data from the camera, processing for the acquired image data, and the like. In such a case, there is a high need to supply more power. In the power control table, a specific function mode for a specific device state may also be indicated for the key scenario. As applicable conditions for the specific function mode, the device and the operating state (device state) are indicated. In other words, a different key scenario is used depending on the device state.

Therefore, the state detection unit 201 may also detect the device state of a device (for example, the camera 27) connected to the main system in addition to the state of the processor. The state detection unit 201 monitors the execution state of a device driver for each device connected directly or indirectly to the chipset 21 to monitor the operating state of the device. For example, the state detection unit 201 detects a device that newly starts working, a device that stops working, and the like. The state detection unit 201 outputs, to the power control unit 217, device state information indicative of the operating state of each device.

The power control unit 217 can refer to the power control table to determine whether or not an app indicated in the boot application information and the boot of which is started is a key app to which a specific function mode is to be applied, and whether or not the device state is an applicable condition. When the device state is the applicable condition, the power control unit 217 determines whether or not the device state indicated in the device state information matches the device state indicated as the applicable condition. The power control unit 217 selects a specific function mode in which the device state matches the applicable condition, refers to the power control table to identify set power related to the selected specific function mode, and set the identified set power for the processor 11. Note that in this example, whether or not the execution state of the key app is the foreground execution is not imposed as an applicable condition.

Figure 10:
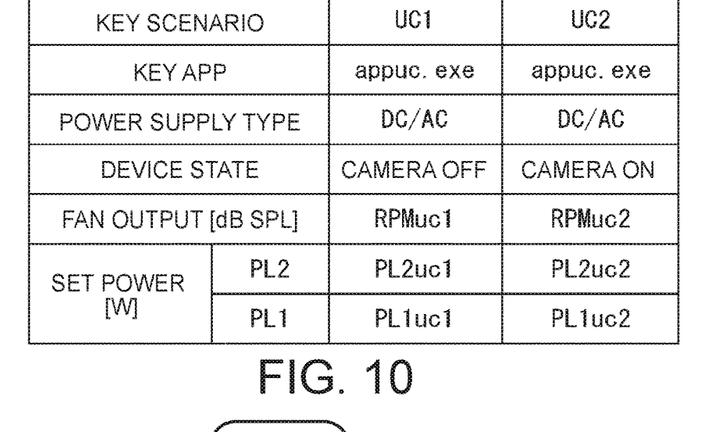
FIG. 10 is a diagram illustrating still another example of the power control table according to one or more embodiments.

FIG. 10 is a diagram illustrating still another example of the power control table. FIG. 10 illustrates two types of unified communications UC1 and UC2 as key scenarios. In the power control table illustrated in FIG. 10, the key app, the power supply type, the device state, the fan output, and the set power are set for each of the unified communications UC1 and UC2, respectively. The unified communications UC1 and UC2 have in common in that the key app is a UC app appuc.exe, and that the power supply type is applied regardless of the presence or absence of power supply from the external power supply. On the other hand, values independent of each other are set for the unified communications UC1 and UC2, that is, RPMuc1 and RPMuc2 as the fan output, PL2uc1 and PL2uc2 as the PL2, and PL1uc1 and PL1uc2 as the PL1, respectively. For example, as PL1uc2 and PL2uc2, values larger than PL1uc1 and PL1uc1 are set, respectively. Thus, since more power is supplied when the camera 27 is working than that when it is not working, various processing in the unified communication is not delayed, and hence usability is not hurt. Further, as RPMuc2, a value larger than RPMuc1 is set. Thus, heat is dissipated according to the increase in power consumption. In the unified communication, audio and video may be continuously transmitted to and from a communication partner while executing any other app such as for material creation in the foreground. In such a case, even when the unified communication is executed in the background, a user is conscious of usability. As an applicable condition of the unified communication UC1, UC2 using audio and video, the background execution is also included without limiting the applicable condition to the foreground execution. Thus, usability is not hurt even for the background execution of the unified communication.

Figure 11:
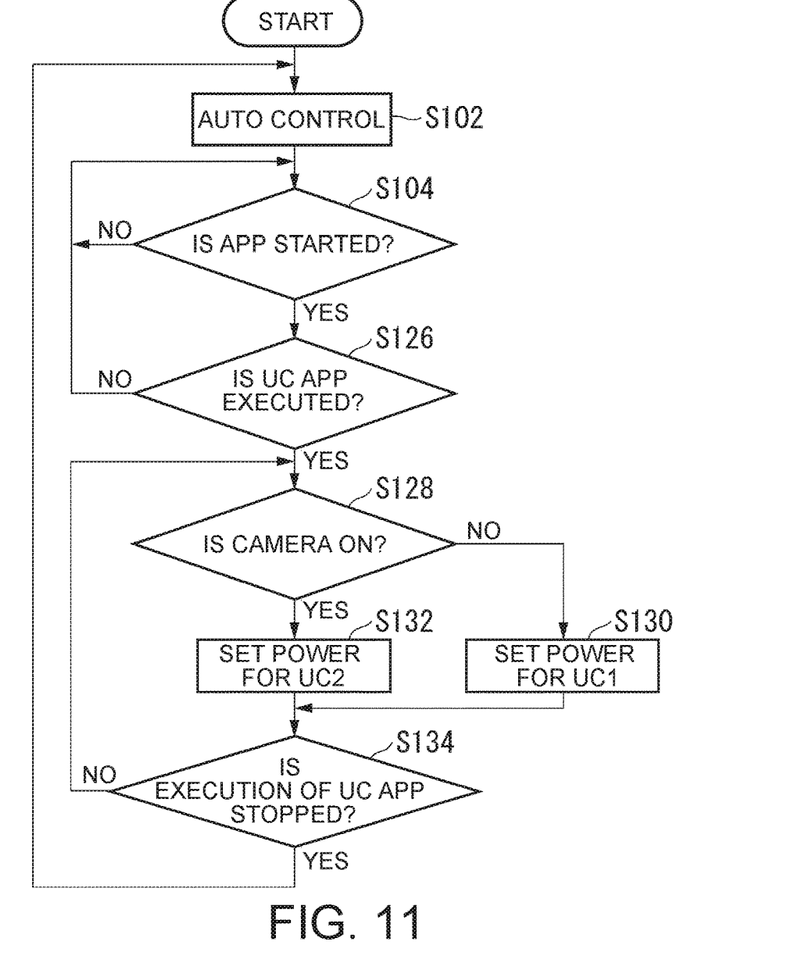
FIG. 11 is a flowchart illustrating another example of the mode transition processing according to one or more embodiments.

Next, another control example of power control modes will be described. FIG. 11 is a flowchart illustrating another example of mode transition processing according to the present embodiment. The processing illustrated in FIG. 11 is started when the power control unit 217 applies the auto control mode. When any UC app is not executed as a key app, a case where the transition between the unified communications UC1 and UC2 is made is taken as an example. As for the processes in step S102 and step S104, the above description is used. However, when the execution start of an app is determined in step S104 (step S104: YES), the power control unit 217 proceeds to a process in step S126.

(Step S126) The power control unit 217 refers to the power control table to determine whether or not the app the execution of which is started corresponds to a UC app. When determining that the app the execution of which is started is a UC app (step S126: YES), the power control unit 217 proceeds to a process in step S128. Even in a case where the app the execution of which is started is a UC app, when it is determined that any other applicable condition is not satisfied (step S126: NO), the power control unit 217 returns to the process in step S104.

(Step S128) The power control unit 217 monitors input device state information to determine whether or not the camera 27 is working (camera-ON determination). When determining that the camera 27 is working (step S128: YES), the power control unit 217 proceeds to a process in step S132. When determining that the camera 27 is not working (step S128: NO), the power control unit 217 proceeds to a process in step S130.

(Step S130) The power control unit 217 determines the unified communication UC1 as the power control mode of the processor 11. The power control unit 217 sets, in the processor 11, PL1uc1 and PL2uc1 as set power parameters related to the unified communication UC1 (set power UC1).

(Step S132) The power control unit 217 determines the unified communication UC2 as the power control mode of the processor 11. The power control unit 217 sets, in the processor 11, PL1uc2 and PL2uc2 as set power parameters related to the unified communication UC2 (set power UC2).

(Step S134) The power control unit 217 monitors input boot application information to determine whether or not the execution of the UC app is stopped. When determining that the execution of the UC app is stopped (step S134: YES), the power control unit 217 returns to the process in step S102 to resume the auto control mode. When determining that the execution of the UC app is not stopped (step S134: NO), the power control unit 217 returns to the process in step S128.

As described above, an information processing apparatus (for example, the information processing apparatus 1) according to the present embodiment includes a processor (for example, the processor 11) with variable rated power, and a power control unit (for example, the power control unit 217) which controls the power consumption of the processor. When processing based on a specific application (for example, a key app) as an application program to implement a specific function (for example, a key scenario) is executed in the foreground, the power control unit sets rated power (for example, PL1) corresponding to at least the specific function.

According to this configuration, when the specific function is executed in the foreground, rated power corresponding to the function is set. The processor operates according to the rated power corresponding to the function. Therefore, power can be consumed more effectively by avoiding the inability to fulfill the function due to wasted power by excessive rated power or supply power shortage. Further, even when two or more programs work, the power consumption can be controlled by prioritizing the specific application executed in the foreground.

An information processing apparatus according to the present embodiment includes a processor connected to a device to input and output predetermined information and whose rated power is variable, and a power control unit to control the power consumption of the processor. When the execution of a specific application as an application program to implement a specific function is detected and the connected device works, the power control unit sets more rated power than that when the device does not work.

The above device is, for example, a camera, and the above specific function is, for example, unified communication.

According to this configuration, when the specific function is executed and the device to input and output the predetermined information works, rated power is set more than that when the device does not work. Therefore, even when power consumption increases by input and output of the predetermined information, since power required for the operation is secured, the processing is not delayed and hence usability is not hurt.

Further, when power is not supplied from an external power supply, the power control unit may set rated power corresponding to the specific function.

According to this configuration, when power is not supplied from the external power supply, since the rated power corresponding to the specific function is set, a waste of power stored in a battery can be suppressed while fulfilling the specific function.

Further, when setting the rated power corresponding to the specific function, the power control unit may further set a short term power limit (for example, PL2) corresponding to the specific function to control the power consumption of the processor so that a short-term moving average value of the power consumption of the processor will not exceed the short term power limit.

According to this configuration, when the specific function is fulfilled, the short term power limit corresponding to the function is further set. Since it is not allowed that the short-term moving average value of the power consumption exceeds the short term power limit, the balance between the fulfillment of the function and power consumption saving can be facilitated by suppressing a temporary increase in power consumption.

Further, when setting the rated power corresponding to the specific function, the power control unit may further set the maximum instantaneous power (for example, PL4) corresponding to the specific function to control the power consumption of the processor so that an instantaneous value of the power consumption of the processor will not exceed the maximum instantaneous power.

According to this configuration, when the specific function is fulfilled, the maximum instantaneous power corresponding to the function is further set. Since it is not allowed that the instantaneous value of the power consumption exceeds the maximum instantaneous power, the balance between the fulfillment of the function and power consumption saving can be facilitated by suppressing an instantaneous increase in power consumption.

Further, the rated power corresponding to the specific function may also be a value so determined that power consumption related to the specific function falls within a range of power consumption values changing significantly according to changes in set power to the processor.

According to this configuration, since the power consumption falls within a range related to the fulfillment of the function, power to be supplied can be consumed effectively.

Note that various parameters related to the above processing are not limited to those mentioned above, and the parameters may also be changed according to various requirements such as the key scenario, the key app, the processing power of the processor 11, the number of pieces, and the size of the chassis. For example, the number of DC mode stages, the values of PL1 and PL2 at each stage, the number of output stages of the cooling fan 351, and the operating temperature may be different.

Further, when determining the continuation of the state of the processor 11, the power control unit 217 may also use, as the power consumption of the processor 11, a representative value representing a changing trend, such as the moving average value or the median up to that point, instead of the instantaneous value. For example, the moving average value may be an exponentially weighted moving average, or a simple moving average value within a predetermined period (for example, 1 to 20 [s]) up to a time to which attention is paid (hereinafter, attention time).

Further, in the above description, the case where the information processing apparatus 1 includes one CPU is mainly taken as an example, but the present disclosure is not limited to this example. The number of CPUs may be two or more, or any other type of processor such as one or more GPUs may also be included. The power control unit 217 needs only to be able to control the power control mode and the power consumption according to the state of each of the respective processors.

Further, some of the devices mentioned above may be separate bodies which are not necessarily placed integrally with the information processing apparatus 1. Such devices may be connected in a manner capable of inputting and outputting various data to and from the other parts of the information processing apparatus 1.

Embodiments have been described in detail above with reference to the accompanying drawings, the specific configurations are not limited to those in the embodiments described above, and design changes are included without departing from the scope of this disclosure. The respective configurations described in the above-described embodiment can be combined arbitrarily. Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS 1 information processing apparatus
11 processor
12 main memory
13 video subsystem
14 display
21 chipset
22 BIOS memory
23 storage device
24 audio system
25 WLAN card
26 USB connector
27 camera
31 EC
32 input unit
33 power supply circuit
34 battery
35 cooling unit
201 state detection unit
213 PM driver
217 power control unit
351 cooling fan
353 temperature sensor
36 power button
403 drive control unit
BD chassis
MB motherboard

What is claimed is:

1. An information processing apparatus comprising:
a processor connected to a camera to input and output predetermined information and whose rated power is variable; and
a power control unit that controls power consumption of the processor, wherein upon determining that execution of a unified communication application has started when the camera is working, the power control unit sets a rated power of the processor to be higher than when the camera is not working.

2. The information processing apparatus according to claim 1, wherein when power is not supplied from an external power supply, the power control unit sets the rated power corresponding to the unified communication application.

3. The information processing apparatus according to claim 2, wherein when setting the rated power corresponding to the unified communication application, the power control unit:
   further sets a power limit corresponding to the unified communication application, and
   controls the power consumption of the processor such that a term moving average value of the power consumption of the processor does not exceed the power limit.

4. The information processing apparatus according to claim 2, wherein when setting the rated power corresponding to the unified communication application, the power control unit:
   further sets maximum instantaneous power corresponding to the unified communication application, and
   controls the power consumption of the processor such that an instantaneous value of the power consumption of the processor does not exceed the maximum instantaneous power.

5. The information processing apparatus according to claim 2, wherein the rated power corresponding to the unified communication application is a value so determined that power consumption related to the unified communication application falls within a range of power consumption values changing according to changes in set power to the processor.

6. A control method for an information processing apparatus including a processor connected to a camera to input and output predetermined information and whose rated power is variable, the control method comprising:
   controlling, with the information processing apparatus, power consumption of the processor; and
   upon determining that execution of a unified communication application has started when the camera is working, setting a rated power of the processor to be higher than when the camera is not working.

* * * * *